Feb. 8, 1955   F. ULRICH ET AL   2,701,824
MOTOR-DRIVEN TELEPHONE SWITCHING DEVICE
Filed Jan. 31, 1952   4 Sheets-Sheet 1

Inventors.
Fritz Ulrich,
Karl Centmajer,
Hans Eder,
Helmut Hofmann, &
Fritz Doering.

By

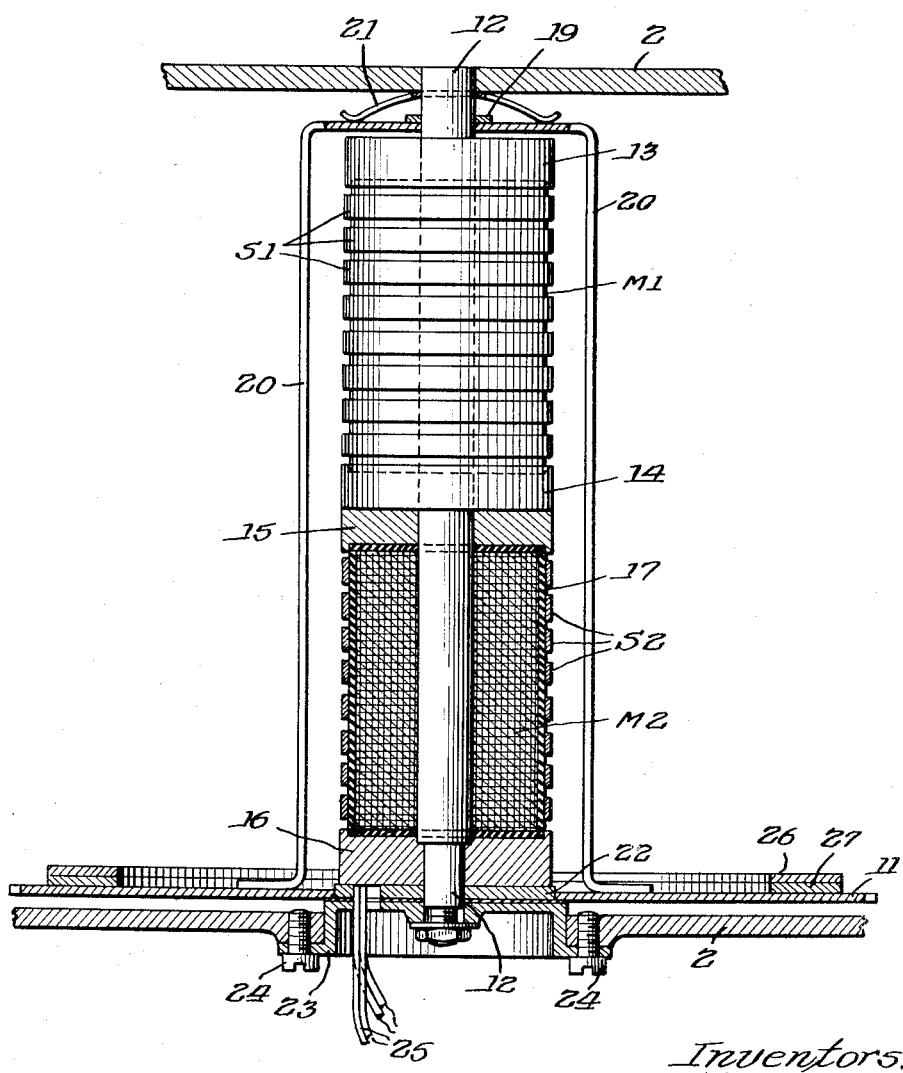

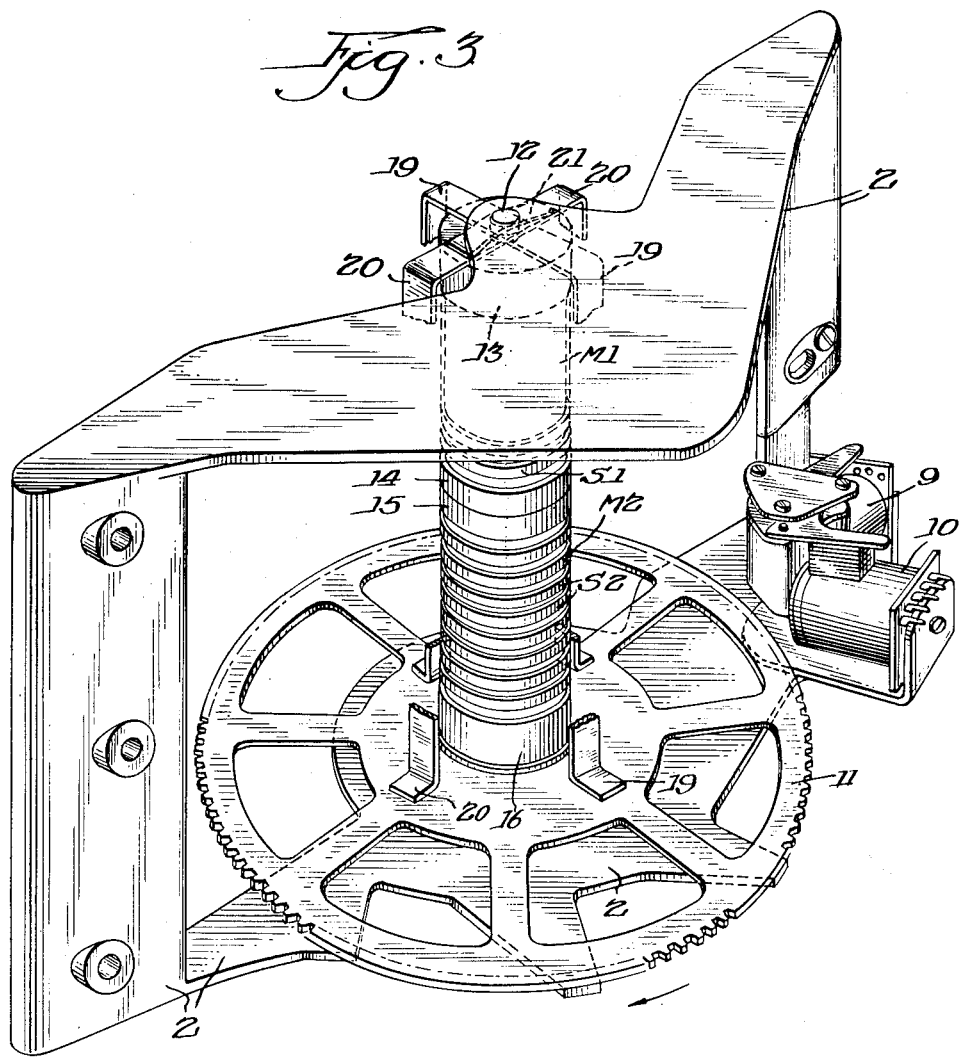

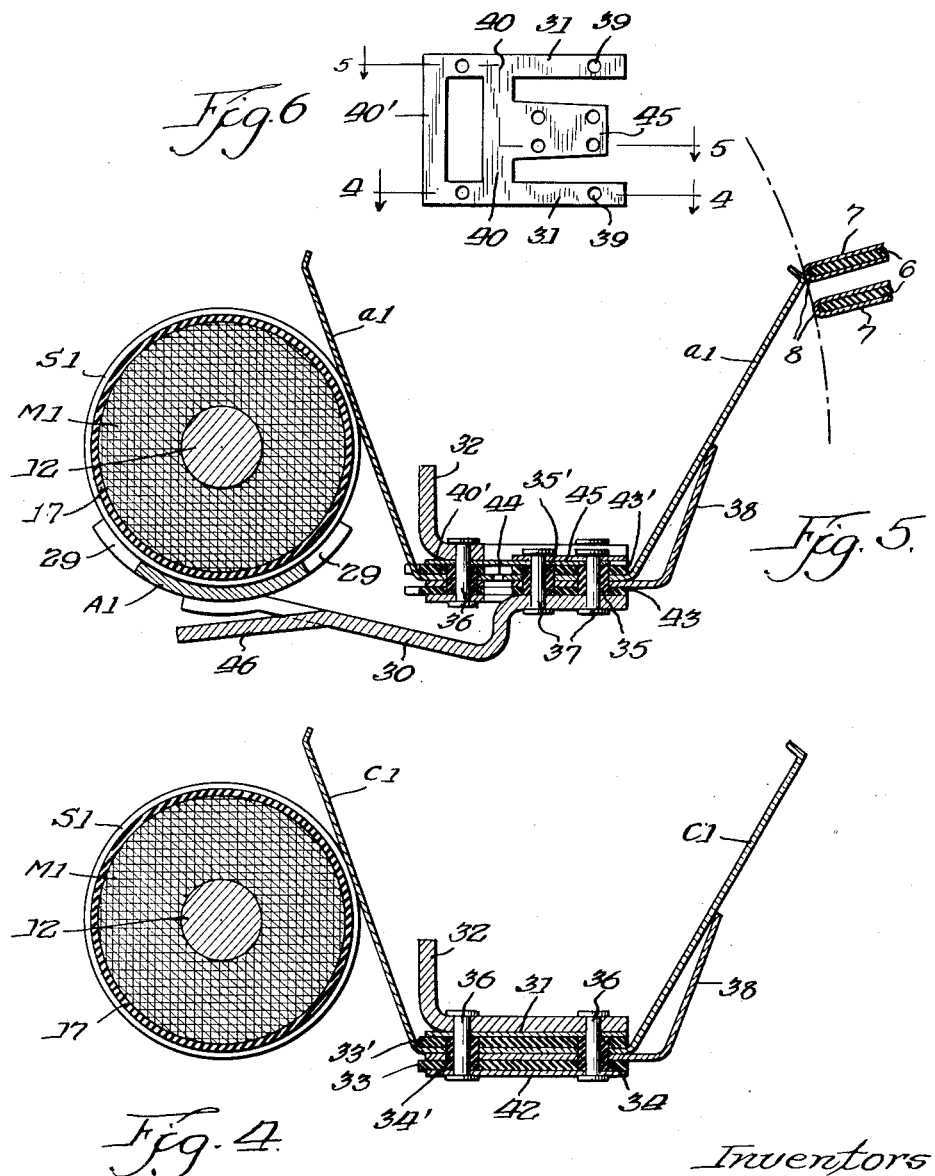

United States Patent Office 2,701,824
Patented Feb. 8, 1955

2,701,824
MOTOR-DRIVEN TELEPHONE SWITCHING DEVICE

Fritz Ulrich, Munich-Solln, Karl Centmaier, Hans Eder, and Helmut Hofmann, Munich, and Fritz Döring, Berlin-Frohnau, Germany, assignors to Siemens & Halske Aktiengesellschaft, Munich, Germany, a corporation of Germany Application January 31, 1952, Serial No. 269,224

Claims priority, application Germany February 5, 1951

18 Claims. (Cl. 179—27.51)

This invention relates to rotary switches for use in telephone switching and other signalling systems and the like, and is particularly concerned with a motor-driven switch having a device which holds the line wipers, during the rotation thereof, out of engagement with the associated bank contacts.

Some of the antecedents of the invention are briefly reviewed below, to aid in the understanding of the detailed description which is to follow.

Prior switch structures of the general type noted above provide a control magnet which holds the line wipers, during the switch operation, against the pressure of a spring, out of engagement with the bank contacts. This operation requires energization of the wiper control magnet prior to initiating the actuation of the switch. The armature of such magnet must operatively affect the rotating wipers, and it is therefore necessary, in structures in which the magnet is disposed on a stationary switch part, to provide for axially adjustable wipers and to place the armature in engagement with an annular groove on the wiper shaft. Disposal of the wiper control magnet on a rotating part of the switch would require current-feed means to the magnet coils over slip rings or over flat segmental contacts and slip brushes. The arrangement of the magnet coils on the rotating part of the switch also appreciably increases the mass of such rotating part, causing inertia forces to become effective during the starting and stopping of the rotation. The disposal of a plurality of magnets serving the wiper-holding device causes difficulties, particularly in instances calling for the provision on the wiper carrier of several wiper groups which are operated by separate magnets.

The object of the invention is to provide the wiper-control device as a unitary sub-assembly in a structurally simple, compact and space-saving manner. The new structure reduces the size of the switch in axial direction and provides for component parts which are easily produced, assembled and adjusted, thereby reducing the manufacturing as well as the maintenance costs. The structure made in accordance with the invention is particularly adapted for rapidly operating motor-driven switches provided with bank multiples formed of metallic strips or wires which are in spiral-like fashion wound on insulating carriers, thus avoiding soldering points, the bending edges of the metallic strips about the insulating carrier forming the bank contacts. Bank multiples of this type are disclosed, for example, in copending application Ser. Nos. 273,847 and 274,014, filed February 28, 1952.

The features indicated in the preceding paragraph are in part realized by disposing the magnet coil of the wiper control device along the switch axis, the core of the coil being formed by the stationary shaft of the switch, and disposing the armature for the magnet pivotally or rotatably on the rotatable wiper carrier for angular displacement relative to the coil. This arrangement saves a special switch shaft and permits to dispose, if needed, several magnet coils for separately operable wiper groups axially one above the other, while utilizing the stationary coil body as a carrier for slip rings required for supplying current to the rotating wipers, thus making it easily possible to arrange the slip rings in the proper vertical planes of the wipers or wiper groups.

Another object of the invention is to provide the pivot axis of the armature of the magnet, which actuates the wipers to engage bank contacts, in parallel with the coil axis and radially spaced therefrom so as to cause the armature to lie in its energized position against pole shoes disposed coaxial with the coil cylinder. The pole shoes are disklike members provided at the opposite ends of the magnet coil for engagement with the armature so as to complete the magnetic circuit. These disklike pole shoes also determine the position of the slip rings on the magnet coil, the configuration of the pole shoes and of the armature being such that the armature does not engage the slip rings in its attracted position.

A generally U- or H-shaped link spring is, in accordance with another feature of the invention, provided as a holding means for the pivotal disposal of the armature on the rotatable wiper carrier. This link spring also serves as a restoring spring for the armature and furnishes a journal therefor, which is free of undesired play. A central portion of the link spring is firmly connected with the armature and also with the line wipers which are to be held out of engagement with the bank contacts, and the legs of the link spring are firmly connected with a mounting member which is fastened on the wiper carrier.

The above indicated and additional features and objects will be brought out in the course of the detailed description of an embodiment of the invention, which will presently be rendered with reference to the drawings. In these drawings:

Fig. 2 illustrates in part sectional enlarged view, the unitary assembly comprising the coils for the line wiper control magnets and the slip rings associated therewith, also showing parts of the wiper carrier as well as the drive wheel, and the manner of mounting these parts partially on and relative to the stationary switch shaft;

Fig. 3 shows a simplified, somewhat enlarged, perspective view of parts of the switch, the wipers and the bank contacts having been omitted, to show particularly the motor drive;

Fig. 4 illustrates a transverse sectional view through a control or private wiper and the means for fastening it on the mounting member of the wiper carrier, also showing the coaction of such wiper with its associated slip ring;

Fig. 5 is a similar sectional view through a line wiper and through the armature of the wiper control magnet, also showing the coaction of such line wiper with bank contacts and with its associated slip ring; and Fig. 6 shows the link spring forming the holding means for resiliently connecting the line wipers with the wiper carrier and with the armature of the wiper control magnet, respectively.

Figure 1:
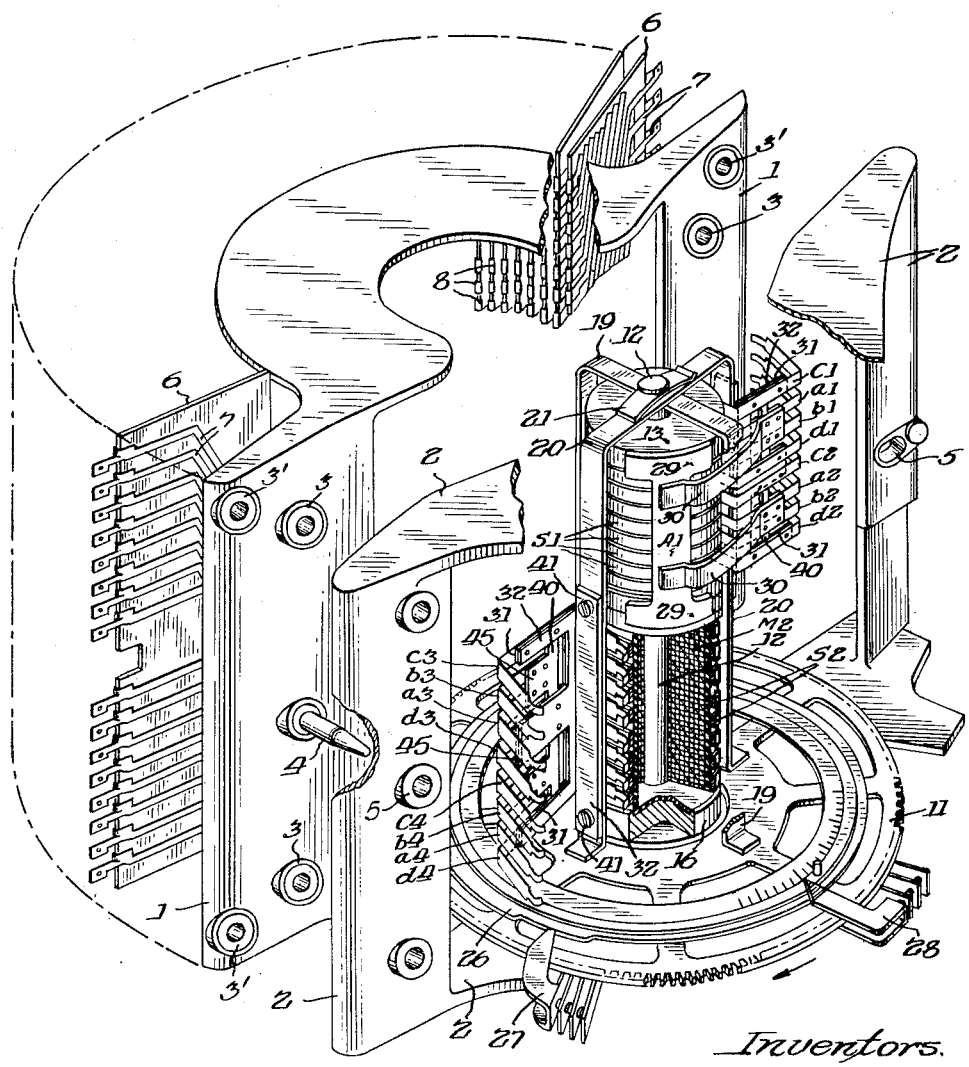
Fig. 1 shows in simplified perspective and enlarged view an example of a motor-driven switch in which the invention may be used, the motor having been omitted for simplification.

Numeral 1 in Fig. 1 indicates the frame for the switch bank contacts. The casing 2 for the switch mechanism, which is a die-cast part just like the frame 1, is interconnected with the latter by screws which are projected through bushings 3. Bushings 3' are provided for fastening the switch on a suitable supporting structure (not shown). The exact position of the casing 2 of the switch mechanism relative to the bank contact frame 1 is determined by the coaction of pins such as 4 with bushings 5, 5'. The pin 4 and the bushing 5 determine the axial and lateral position of the mechanism on one side thereof, while a similar pin and bushing 5' determine only the axial position, the bushing 5' forming a slot.

The bank contacts are formed by metallic strips 7, shown in Figs. 1 and 5, which are in spiral-like fashion wound about platelike insulating members 6. The radially inwardly facing bent portions of these strips form the bank contact points 8 for wiping coaction with wipers arranged in sets marked $a_1$, $b_1$, $c_1$, $d_1$, $a_2$, $b_2$, $c_2$, $d_2$, $a_3$, $b_3$, $c_3$, $d_3$ and $a_4$, $b_4$, $c_4$, $d_4$.

The drive or stepping motor comprises, as shown in Fig. 3, two magnet coils 9, 10. These coils are perpendicularly disposed one relative to the other and drive, by means of a rotary armature, a pinion (not shown) meshing with the drive wheel 11 to rotate the drive wheel in the direction of the arrow. The drive wheel thus rotates about the fixedly disposed shaft 12. This shaft forms the switch axis and also forms the core for the two coils M1 and M2 of the line wiper control magnets.

Disklike pole shoes 13, 14, 15, 16, best shown in Figs.

2 and 3, are provided at the ends of the magnet coils which are disposed on the core 12, the core forming the stationary switch axis. The pole shoes 13 and 14 serve as backings or stops for the armature A1 (Figs. 1 and 5) of the wiper control magnet M1 and the pole shoes 15 and 16 serve similarly, for a like armature coacting with the magnet coil M2. The latter armature is not visible in Fig. 1, being concealed by the coil M2.

Between the pole shoes 13—14 are disposed the slip rings S1 and between the pole shoes 15—16 are disposed similar slip rings S2. These slip rings are provided for coaction with the various switch wipers. Each slip ring is an annular metallic band suitably disposed on a tubular insulating member 17.

The wiper carrier (which is fixedly connected with the drive wheel 11) comprises generally U-shaped yoke members 19, 20 disposed crosswise, as shown, and journalled on the shaft 12. The axial position of the yoke members 19, 20 is fixed by a bowed spring 21 (see also Fig. 2) which rests against the top wall of the casing 2. The bowed spring thus holds the wiper carrier and associated parts in position against undesired play.

The drive wheel 11 is journalled on the shaft 12 by means of a metal disk 22 (Fig. 2) which is connected with a cup-shaped bushing 23. The latter is fastened on the bottom wall of the casing 2.

The magnet coils M1 and M2, with the associated disklike pole shoes 13—16 and with the sets of slip rings S1 and S2, and together with the disk 22 and the bushing 23, are placed on the shaft 12 within the cage formed by the yoke members 19, 20, from the underside of the bottom casing wall 2, through openings in the such casing wall and in the drive wheel 11, respectively. The upper end of the shaft 12 is inserted into a journal hole in the top wall of the casing 2, and the bushing 23 is thereupon fastened to the bottom casing wall by the screws 24. Numeral 25 in Fig. 2 indicates conductors leading to the coil terminals and to the slip rings, respectively.

Cam wheels 26 are firmly connected with the drive wheel 11. As may be seen from Fig. 1, these cam wheels control, by means of levers 27—28, sets of contacts disposed on the bottom wall of the casing 2. The contacts include decade contacts, resting or intermediate position contacts, and normal contacts required for controlling the switch operation. The cam levers 27—28 are pivotally mounted on the bottom wall of the casing 2.

In the illustrated switch example there are provided two groups of wipers (each comprising two sets) which are displaced by 180° and disposed in different vertical levels.

Each group is subdivided into two sets or sub-groups. The line wipers $a$ and $b$ are disposed centrally of each sub-group, and the control or private wipers $c$ and $d$ are disposed on the outside thereof. The line wipers $a_1$—$b_1$ and $a_2$—$b_2$ are held during their rotation out of engagement with the bank contacts, and are upon stopping pressed against the selected bank contacts by the armature A1 which is actuated responsive to energization of the magnet coil M1. The line wipers $a_3$—$b_3$ and $a_4$—$b_4$ are in like manner controlled by a similar armature actuated responsive to energization of the magnet coil M2, which armature is not visible in Fig. 1, being concealed by the magnet M2, and it will therefore suffice to describe details only with respect to the structure which controls the line wipers $a_1$—$b_1$ and $a_2$—$b_2$, such structure comprising the armature A1.

The armature A1, as will be seen from Figs. 1 and 5, is an I-shaped arcuate structure forming at the opposite ends pole pieces 29 which are arcuately formed in accordance with the peripheral surface of the associated magnet coil M1. The elongated strip-like actuating members 30, which are fixedly connected with the center bar of the armature A1, are provided for pivotally mounting the armature A1 for arcuate displacement about an axis which extends in parallel with the axis of the shaft 12 and radially spaced therefrom. The journal link for the armature A1 is a stamped leaf spring having the arms 31, bars 40 and 40' and the platelike extension 45 (see Fig. 6). On the platelike extension 45 are mounted portions of the line wipers $a_1$—$b_1$ as well as one end of the elongated actuating member 30 which extends from the armature A1, while the arms 31 of the journal link are fixedly connected with a mounting member coacting with the wiper carrier.

The manner in which the link spring (Fig. 6) is connected with its associated parts is apparent from Figs. 4 and 5, Fig. 4 being a sectional view through the control or private wiper $c_1$ and its mounting on the mounting member 32 coacting with the wiper carrier, and Fig. 5 being a similar sectional view in two planes, namely, respectively through a portion of the line wiper $a_1$ and the actuating member 30 extending from the armature A1, which are connected with the extension 45 of the link spring and through another portion of such line wiper which is connected with the mounting member 32 coacting with the wiper carrier.

The springs forming the wipers have the form of open trapezoids, with the base thereof connected with the wiper carrier and the legs forming the wipers. One of these legs engages a slip ring S1, and the other sweeps over the bank contacts 8 (not shown in Fig. 4).

The individual trapezoidal wipers are assembled to form an operating unit with the armature A1 and the angular mounting member 32 of the wiper carrier, the assembly including the insulating members 33, 33' and the insulating bushings 34, 34' and 35, 35'. Suitable rivets, for example, tubular rivets 36—37, connect the parts together. The wiper legs facing the bank contacts rest against stops or backing members 38 which are likewise connected with the angular mounting member 32 of the assembly. The link spring shown in Fig. 6 is provided with holes 39 for the rivets 36, 37. The resilient portion of the link spring is formed by the section 40 which is torsionally displaced. The central portion 45 laterally projecting from the section 40 is broadened to form a platelike extension for connection with the striplike member 30 extending from the armature A1 and with the bases of the two springs which form the line wipers $a_1$ and $b_1$.

The core 12 of the coil is shown in Figs. 4 and 5 in section. The armature A1 is shown in Fig. 5 in attracted position in which the pole pieces 29 engage the pole shoe disks 13, 14. From Fig. 4 it will be seen that the private wipers such as $c_1$ are connected with the angular mounting member 32 which is by means of screws 41 (Fig. 1) mounted on the yoke member such as 19, 20 of the wiper carrier. The wiper $d_1$ and also the wipers $c_2, d_2, c_3, d_3, c_4, d_4$ are similarly mounted. The parts of the assembly comprising the cover plate 42, the insulating plates 33—33', the stop or backing members 38, the wipers $a_1$—$d_2$, the link spring with its portions 31, 40, 40', 45 and the angular mounting member 32, are held together by means of the rivets 36, as shown in Fig. 4. However, the base of the line wipers $a_1, b_1$ is connected by rivets 36 with the angular mounting member 32 only on the side thereof which faces the slip rings 18. The base portions of these line wipers $a_1, b_1$ (also $a_2, b_2$) from which extend the legs facing the bank contacts are, as shown in Fig. 5, connected by the rivets 37 with the extension 45 of the link spring and with the actuating member 30 projecting from the armature A1 with the link spring being held between insulating members 43, 43'. In order to secure the required resiliency of the line wipers $a_1, b_1$, etc., between their mounting points at the rivets 36—37, these wipers are provided with angular notches 44, as indicated in Fig. 5.

In the attracted position of the armature A1 the arms or legs of the line wipers $a_1, b_1, a_2, b_2$ facing the bank contacts 8 will be pressed against such bank contacts 8, as shown in Fig. 5. The legs of the line wipers facing the slip rings are firmly secured to the mounting member 32 (and therewith to the wiper carrier) and are not displaced responsive to attraction of the armature to assume the operated position shown in Fig. 5. These legs therefore are always in engagement with the associated slip rings. The torsional force of the link spring as well as the pressure of the line wipers in engagement with the bank contacts, will attempt to restore the armature, which will occur upon de-energization of the magnet coil, thereby removing the corresponding legs of the line wipers $a_1, b_1$, etc., from engagement with the bank multiple contacts. The control or private wipers such as $c_1$ on the arms 31 of the link spring are firmly secured to the mounting member 32 (and therewith to the wiper carrier) and are therefore not affected by the angular displacement of the armature; their arms remain respectively in engagement with the associated slip rings and in wiping coaction with the corresponding bank contacts.

The extension 46 (Fig. 5), which rests in normal position of the armature A1 against a vertically extending portion of the wiper carrier, is provided for carrying out adjustments of the wiper-operating mechanism.

What is believed to be new and desired to have protected by Letters Patent is defined in the appended claims.

We claim:

1. In a rotary switch of the class described having a stationary shaft forming the axis thereof and means forming bank contacts and having wipers for selective engagement with said bank contacts and a rotatable wiper carrier and means for rotating said wiper carrier to rotate said wipers relative to said bank contacts, a device for holding said wipers during the rotation thereof out of engagement with said bank contacts and to move said wipers into engagement with selected bank contacts at the conclusion of the rotation thereof, said device comprising resilient holding means secured to said wiper carrier for rotation therewith, a portion of said holding means resiliently extending from said wiper carrier, an elongated actuating member, means for securing one end of said actuating member and portions of said wipers on the portion of said resilient holding means which extends from said wiper carrier, an armature carried by said actuating member at the other end thereof, and a stationary magnet coil and pole shoe means therefor disposed coaxial with the switch axis for controlling the operation of said armature, said resilient holding means being effective to hold said wipers with their free ends out of engagement with said bank contacts during the rotation thereof and to hold said armature coincidentally in released position, said coil being upon energization thereof effective to actuate said armature to move into attracted position into engagement with said pole shoe means, whereby said resilient holding means is pivotally angularly displaced about an axis which extends radially spaced from and in parallel with the axis of said stationary shaft for moving said wipers with their free ends into engagement with selected bank contacts upon conclusion of the rotation thereof.

2. The structure defined in claim 1, wherein said switch shaft forms the core for said stationary magnet coil.

3. The structure defined in claim 1, comprising slip ring means on said stationary magnet coil for supplying current to said wipers.

4. The structure defined in claim 1, comprising a current supply arm extending from each wiper, and a slip ring on said stationary magnet coil engaged by each arm for supplying current to the associated wiper, said pole shoe means holding said armature in attracted position thereof out of engagement with said slip rings.

5. The structure defined in claim 1, wherein said armature is of arcuate form, its concave side facing the associated magnet coil, and wherein said resilient holding means is a leaflike spring extending from said wiper carrier.

6. The structure defined in claim 1, wherein said wiper carrier comprises a pair of generally U-shaped crosswise disposed members, the transverse crossing portions of said members being rotatably journalled on said switch shaft, a motor-driven drive wheel, the longitudinal legs of said members being firmly connected with said drive wheel, said resilient holding means being secured to one of said legs, the other leg forming a stop for said armature in normal position thereof.

7. The structure defined in claim 1, comprising a spring having a base portion and a leg angularly extending therefrom at either end thereof, one of said legs constituting said wiper for coaction with said bank contacts and the other leg constituting circuit connection means therefor, a pair of fastening members, said base portion being disposed between said fastening members and being secured therewith on said resilient holding means, notches being provided in said base for elastically disposing it between said fastening members.

8. The structure defined in claim 1, comprising a mounting member, said resilient holding means for securing said wipers comprising an angularly shaped link member, one leg of said link member forming a spring portion, means for firmly connecting said spring portion with said elongated actuating member, and means for firmly connecting another leg of said link member with said mounting member.

9. The structure defined in claim 1, comprising a mounting member, a link spring constituting said resilient holding means, and means for firmly connecting the opposite ends of said link spring with said mounting member and with said elongated actuating member, respectively.

10. The structure defined in claim 1, wherein each of said wipers comprises a mounting portion and a leg extending therefrom for coaction with said bank multiple contacts, a mounting member carried by said wiper carrier, said resilient holding means being secured to said mounting member and said mounting portions of said wipers being secured to and extending from said holding means, and a backing member also secured on said mounting member for determining the normal position of said wipers.

11. The structure defined in claim 1, wherein said resilient holding means is a leaflike spring having a plurality of arms, a mounting member, means for securing said spring on said mounting member with certain arms in rigid engagement therewith and with one arm resiliently extending therefrom to form said holding means, and auxiliary wipers secured to said arms which are in rigid engagement with said mounting member.

12. The structure defined in claim 1, comprising a plurality of groups of wipers carried by said wiper carrier, each group comprising line wipers and control wipers, respectively, and a plurality of magnets, one for controlling the line wipers in each group.

13. The structure defined in claim 1, comprising a plurality of groups of wipers carried by said wiper carrier, each group comprising line wipers and control wipers, respectively, and a plurality of magnets, one for controlling the line wipers in each group, said magnets being axially serially disposed on said switch shaft.

14. The structure defined in claim 1, comprising a plurality of groups of wipers carried by said wiper carrier, each group comprising line wipers and control wipers, respectively, and a common magnet for controlling the line wipers in each group to place such line wipers into engagement with said bank contacts at the conclusion of the rotation thereof.

15. The structure defined in claim 1, comprising a plurality of groups of wipers carried by said wiper carrier, each group comprising line wipers and control wipers, respectively, and a plurality of magnets, one for controlling the line wipers in each group to place such line wipers into engagement with said bank contacts at the conclusion of the rotation thereof, said wiper groups being disposed on said wiper carrier in different levels thereof and angularly displaced relative to each other.

16. The structure defined in claim 1, comprising a motor-controlled drive wheel for rotating said wiper carrier, bushing means carried at one end of said switch shaft for journalling said drive wheel, said wiper carrier being journalled at the other end of said shaft, and spring means at said other end in engagement with said wiper carrier for absorbing the axial play of said shaft and wiper carrier and said drive wheel.

17. The structure defined in claim 1, comprising a casing for holding said switch shaft and parts associated therewith including said wiper carrier and the wipers carried thereby, and means on said casing for positioning said magnet coil thereon axially thereof and for determining the position of said shaft.

18. The structure defined in claim 1, comprising a housing for holding said bank contacts and a casing for holding said shaft and associated parts including said wiper carrier and the wipers carried thereby, fitting means for securing said casing on said housing at one side thereof and for determining the axial and the lateral position of said casing at such side, and fitting means for securing said casing on said housing at the other side thereof, said last-named fitting means determining the axial position of said casing on said housing.

References Cited in the file of this patent

UNITED STATES PATENTS

| | | |
|---|---|---|
| 973,175 | Craft | Oct. 25, 1910 |
| 1,295,175 | Keith et al. | Feb. 25, 1919 |
| 1,543,824 | Craft | June 30, 1925 |
| 2,146,228 | Richter | Feb. 7, 1939 |